Aug. 28, 1951

M. KOS 2,565,972

ROTARY VALVE FOR TWO-STROKE
INTERNAL-COMBUSTION ENGINES

Filed May 20, 1950

Inventor
MICHAEL KOS
By: Fetherstonhaugh & Co.
Att'ys

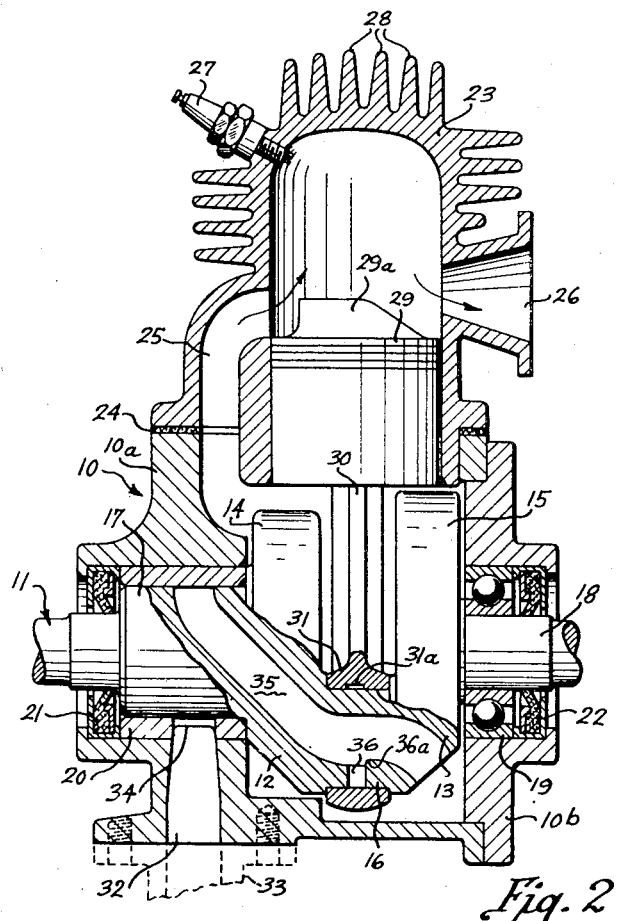
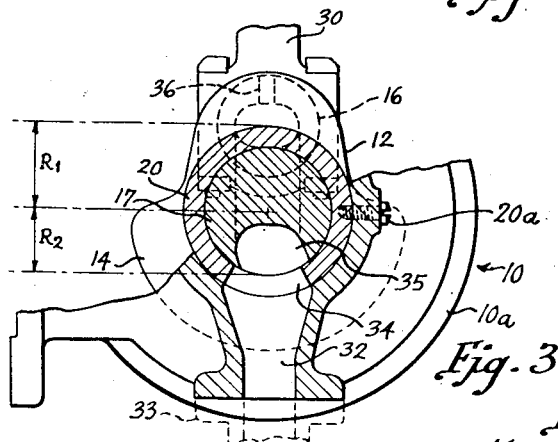

Patented Aug. 28, 1951

2,565,972

UNITED STATES PATENT OFFICE 2,565,972

ROTARY VALVE FOR TWO-STROKE INTERNAL-COMBUSTION ENGINES

Michael Kos, Orillia, Ontario, Canada, assignor to Autotrac Limited, Orillia, Ontario, Canada, a corporation of Canada Application May 20, 1950, Serial No. 163,180
In Canada May 26, 1949

3 Claims. (Cl. 123—73)

This invention relates to two-stroke internal combustion engines generally, and more particularly to a rotary inlet valve for two-stroke engines with crank case compression.

The majority of two-stroke engines have piston-controlled inlet, exhaust, and transfer ports. While the simplicity of this arrangement is meritorious, a disadvantage attends the employment of the piston-controlled inlet port, namely an undesirably short induction period.

The substitution of various forms of rotary valves for the piston-controlled inlet port has been resorted to by several manufacturers. Successful examples of simple rotary valves for two-strike engines are ducts leading through one of the shafts of the crankshaft or through one of these shafts and one of the cranks itself.

I have found that through the provision of a rotary valve which consists essentially of a duct leading through a portion of one of the shafts, the cranks, and the crank pin, I not only achieve a rotary valve which lengthens the induction period in an effective manner, but also possesses marked advantages over all rotary valves for two-stroke engines previously known to the inventor.

These advantages may generally be described as improved cooling of the connecting rod big-end bearing, and extraction of heat from the piston, improved lubrication of the connecting rod big-end bearing, and improved mixing of the induced mixtures. The nature of these advantages, and the manner in which my rotary valves achieve these advantages, will be more fully set out in the body of the specification.

The invention, in its broadest aspect, comprises the provision, in a two-stroke internal combustion engine, having a sealed crank case, a crankshaft rotatably mounted within the crank case, and at least one piston operatively connected to said crankshaft, said crankshaft consisting of two cranks joined by a crank pin, and shafts extending from said cranks; of a rotary valve which comprises a passageway leading into said crank case and a continuous duct leading through a portion of one of said shafts, through one of said cranks, said crank pin and the other of said cranks, and communicating with the interior of said crank case, said passageway and said duct registering with one another when said piston is at its outer dead centre position, said duct coming out of registry with said passageway as said piston moves inwardly from its outer dead centre and rotates said crankshaft.

The nature of my invention will be more clearly understood after a study of the following specification and the accompanying drawings.

In the drawings:

Figure 2 is a cross-sectional view of the engine shown in Figure 1 but with the piston in the inner dead centre position; and Figure 3 is a fragmentary sectional view taken along the line 3—3 in Figure 1. In this view, the upper portion of the crank case has been broken away to more clearly illustrate the parts therewithin.

Throughout the three figures like reference numerals refer to like parts.

Figure 1:
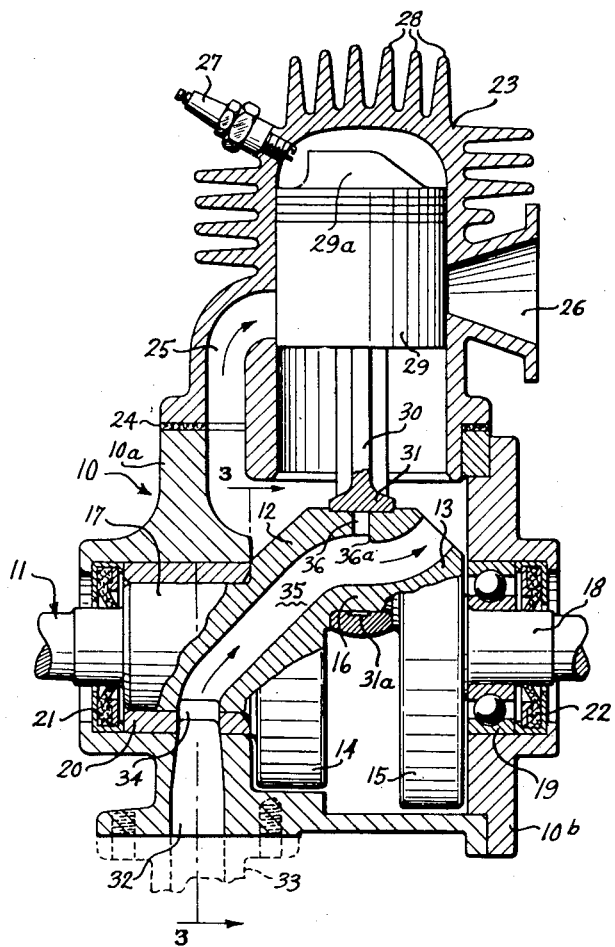
Figure 1 is a cross-sectional view of a two-stroke engine employing a rotary valve according to my invention and shows the piston in the outer dead centre position.

Numeral 10 generally indicates a crank case, having a main portion 10a, and an end plate 10b. A crankshaft, generally indicated by the numeral 11, is rotatably mounted within the crank case. Crankshaft 11 consists of cranks 12 and 13 having integrally formed bobweights 14 and 15 respectively, a crank pin 16 joining the cranks 12 and 13, and axially aligned shafts 17 and 18 extending outwardly from cranks 12 and 13 respectively. Roller bearings 19, mounted within the crank case 10, mount shaft 18, and an annular bushing 20 mounted within the crank case and held against rotation by a screw 20a, mounts shaft 17. Annular gas-tight and oil-tight seals 21 and 22 are mounted at opposed ends of crank case 10 and are concentrically disposed about shafts 17 and 18 respectively.

A cylinder 23 is rigidly mounted upon the crank case, and a gasket 24 is inserted between the cylinder 23 and the crank case 10. A transfer port 25 extends between the interior of the crank case and the interior of the cylinder 23 and an exhaust port 26 is provided in the cylinder 23. A spark plug 27 is disposed adjacent the top of cylinder 23. Cylinder 23 is provided with cooling fins 28.

A piston 29 is slidably mounted within cylinder 23 and is operatively connected to the crankshaft 11 by means of a connecting rod 30 having a big-end bearing 31 rotatably mounted upon crank pin 16 and a little-end bearing (not shown) connecting the rod 30 to the piston 29. Piston 29 is provided with a conventional deflector 29a.

A passageway 32 extends through the wall of the crank case 10. An air filter or carburetor (a portion of which is indicated in dotted lines numbered 33) is secured to the outer surface of the crank case and communicates with passageway 32. An orifice 34 is located in bushing 20, in communication with passageway 32. A continuous duct 35 extends through a portion of shaft 17, and through crank 12, crank pin 16 and crank 13. A lubricating port 36 extends through crank pin 16, leading from the duct 35 to the outer surface of the crank pin where it communicates with the interior surface of big-end bearing 31. A deflecting shoulder 36a is disposed adjacent the port 36. An oil groove is formed in the big-end bearing as indicated at 31a.

The operation of the above described engine is as follows. With the exception that the rotary valve of my invention replaces the conventional inlet port, the operation is essentially that of a two-stroke internal combustion engine having piston-controlled inlet, exhaust, and transfer ports and crank case compression.

As piston 29 travels outwardly in the cylinder 23, duct 35 is out of registry with passageway 32 and a partial vacuum is established in the sealed crank case 10. A charge in the combustion chamber, i. e., the upper portion of cylinder 23, is compressed at the same time. As the piston reaches outer dead centre, duct 35 is brought into register with orifice 34 and passageway 32. Air, or an air-fuel mixture, or an air-fuel-oil mixture is drawn, under the influence of the partial vacuum within the crank case, through air filter or carburetor 33, and through passageway 32, orifice 34, and duct 35, into the interior of the crank case. When the piston 29 is at substantially outer dead centre the compressed gases in the combustion chamber are fired by the spark plug 27. Expansion of the fired charge causes the piston to travel inwardly, and a new charge is compressed in the crank case. The burned gases are exhausted through exhaust port 26 as the piston clears this port during its inward travel. The charge compressed in the crank case is permitted to enter the combustion chamber when the piston clears transfer port 25 during inward travel of the piston. Deflector 29a prevents intermingling of the charge entering the cylinder with that being exhausted.

It will be noted that since the crank case is sealed, compression can be carried out in the crank case as long as duct 35 is out of register with orifice 34. The gases which will be normally drawn through the duct 35 are either, air, or an air-fuel mixture, or an air-fuel-oil mixture, the oil being provided for lubrication purposes. Air alone would be drawn through duct 35, in the case where fuel was injected directly into the combustion chamber. It will be appreciated that although a fuel injection two-stroke internal combustion engine has not been shown in the drawings, the rotary valve of my invention could well be employed for the delivery of air into the crank case of such an engine.

When an air-fuel mixture passes through duct 35, which extends through a portion of the crankshaft which is heated during operation of the engine, thorough mixing of the air and fuel occurs as the mixture flows turbulently through the heated rotating crankshaft.

It will also be noted that the incoming cool mixture passes through the crank pin and serves to cool this element, thus increasing the operation safety of the connecting rod big-end bearing by cooling the latter. The cooling of the crank pin also aids the extraction of surplus heat from the piston via the connecting rod.

When lubricating oil is included in the mixture drawn through the duct 35, droplets of oil tend to fall out of the mixture as it passes through the crankshaft. Centrifugal force throws this oil against the walls of the duct, and some of this oil enters port 36 which leads to the outer surface of the crank pin 16. The amount of oil entering the port 36 is increased by the presence of shoulder 36a. Oil reaching this outer surface serves to lubricate the connecting rod big-end bearing 31.

I have found that an efficient slide-connecting big-end bearing may be employed instead of the conventional anti-friction roller bearings, since sufficient cooling and positive lubrication are provided in the preferred form of my invention which includes the lubricating port 36. The fact that a reliable slide-connecting big-end bearing may be employed leads to substantial savings in the manufacture of two-stroke engines.

Where roller or other anti-friction connecting rod big-end bearings are employed in conjunction with the rotary valve of my invention, the cooling and positive lubrication of the big-end bearing present an additional safety factor and impart a longer life to the bearings.

The fresh charge which is drawn through the duct 35, by means of the partial vacuum established within the crank case, is subject not only to this force but to centrifugal force, since the crankshaft 11 is rotating. With the rotary valve of my invention, the outlet radius, indicated at $R_1$ in Figure 3, is greater than the inlet radius, indicated at $R_2$ in Figure 3. Since centrifugal force increases with circumferential speed, the centrifugal force tending to throw the gases from the outlet of the duct is greater than that tending to throw the gases from the inlet of the duct. The resultant centrifugal force assists movement of the gases in the direction imparted by the partial vacuum.

While crankshaft 11 has been shown in the drawings as an integrally cast structure, it will be appreciated that the rotary valve of my invention could be employed, where for example, the crank pin is a separately formed element, which is secured to the cranks when the crankshaft is assembled.

Furthermore, while I have described the valve of my invention as applied to a single-cylinder two-stroke engine, it will be appreciated that the valve could be employed in conjunction with multi-cylinder two-stroke engines without departing from the spirit of the invention.

While certain embodiments of the invention have been disclosed, it is to be understood that the inventive idea may be carried out in a number of ways. This application is not to be limited by the precise details described, but is intended to cover all variations and modifications thereof falling within the spirit of the invention or the scope of the appended claims.

What I claim as my invention is:

1. In a two-stroke internal combustion engine having a crank case, a crankshaft rotatably mounted within the crank case, and at least one piston operatively connected to said crankshaft, said crankshaft consisting of two cranks joined by a crank pin, and shafts extending from said cranks; a rotary valve which comprises a passageway leading into said crank case, and a continuous duct leading through a portion of one of said shafts, through one of said cranks, said crank pin, and the other of said cranks, and communicating with the interior of said crank case, said passageway and said duct registering with one another when said piston is at its outer dead centre position, said duct coming out of registry with said passageway as said piston moves inwardly from its outer dead centre and rotates said crankshaft, and a lubricating port leading from the interior of said continuous duct to the outer surface of said crank pin.

2. In a two-stroke internal combustion engine having a crank case, a crankshaft rotatably mounted within the crank case, and at least one piston operatively connected to said crankshaft, said crankshaft consisting of two cranks joined by a crank pin, and shafts extending from said cranks; a rotary valve which comprises a passageway leading into said crank case, and a continuous duct leading through a portion of one of said shafts, through one of said cranks, said crank pin, and the other of said cranks, and communicating with the interior of said crank case, said passageway and said duct registering with one another when said piston is at its outer dead centre position, said duct coming out of registry with said passageway as said piston moves inwardly from its outer dead centre and rotates said crankshaft, and a shoulder formed on the inner surface of said continuous duct adjacent said lubricating port, said shoulder being adapted to direct into said port lubricating oil being drawn through said duct during rotation of said crankshaft.

3. In a two-stroke internal combustion engine having a crank case, a crankshaft rotatably mounted within the crank case, and at least one piston operatively connected to said crankshaft, said crankshaft consisting of two cranks joined by a crank pin, and shafts extending from said cranks; a rotary valve which comprises a passageway leading into said crank case, and a continuous duct leading through a portion of one of said shafts, through one of said cranks, said crank pin, and the other of said cranks, and communicating with the interior of said crank case, said passageway and said duct registering with one another when said piston is at its outer dead centre position, said duct coming out of registry with said passageway as said piston moves inwardly from its outer dead centre and rotates said crankshaft, a lubricating port leading from the interior of said continuous duct to the outer surface of said crank pin, and a shoulder formed on the inner surface of said continuous duct adjacent said lubricating port, said shoulder being adapted to direct into said port lubricating oil being drawn through said duct during rotation of said crankshaft.

MICHAEL KOS.

REFERENCES CITED

The following references are of record in the file of this patent:

UNITED STATES PATENTS

| Number | Name | Date |
| --- | --- | --- |
| 1,473,602 | Brockway | Nov. 6, 1923 |
| 2,031,042 | Harrington | Feb. 18, 1936 |
| 2,111,324 | Linthwaite | Mar. 15, 1938 |
| 2,172,147 | Smith | Sept. 5, 1939 |
| 2,273,202 | Jackson | Feb. 17, 1942 |